US010523101B2

United States Patent
Iwasaki et al.

(10) Patent No.: US 10,523,101 B2
(45) Date of Patent: Dec. 31, 2019

(54) MOTOR

(71) Applicant: TDK CORPORATION, Tokyo (JP)

(72) Inventors: Makoto Iwasaki, Tokyo (JP);
Fumitaka Baba, Tokyo (JP); Chikara Ishizaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 297 days.

(21) Appl. No.: 15/608,067

(22) Filed: May 30, 2017

(65) Prior Publication Data
US 2017/0346432 A1  Nov. 30, 2017

(30) Foreign Application Priority Data
May 30, 2016  (JP) ................ 2016-107775

(51) Int. Cl.
| | |
|---|---|
| *H02K 41/03* | (2006.01) |
| *H02P 29/66* | (2016.01) |
| *H02K 1/27* | (2006.01) |
| *H02P 21/22* | (2016.01) |
| *H02P 27/04* | (2016.01) |

(52) U.S. Cl.
CPC ........... *H02K 41/031* (2013.01); *H02K 1/27* (2013.01); *H02K 1/2766* (2013.01); *H02P 21/22* (2016.02); *H02P 27/04* (2013.01); *H02P 29/662* (2016.11)

(58) Field of Classification Search
CPC ........ H02P 21/22; H02P 29/662; H02P 27/04; H02K 1/2766; H02K 1/27; H02K 41/031
See application file for complete search history.

(56) References Cited

U.S. PATENT DOCUMENTS

| | | | | |
|---|---|---|---|---|
| 2002/0140309 | A1* | 10/2002 | Yanashima | F04B 35/04 310/162 |
| 2010/0289366 | A1* | 11/2010 | Komuro | C22C 1/0441 310/156.01 |
| 2013/0257190 | A1* | 10/2013 | Hamer | H02K 9/22 310/52 |

(Continued)

FOREIGN PATENT DOCUMENTS

JP  2008-029148 A  2/2008

OTHER PUBLICATIONS

Ding, Xiao-feng et. al., "Modeling of Permanent Magnets Temperature of Traction Motors in HEV", Electric Machines and Control, vol. 16, No. 10, pp. 101-106, Oct. 15, 2012.

(Continued)

*Primary Examiner* — Mohamad A Musleh
(74) *Attorney, Agent, or Firm* — Oliff PLC

(57) ABSTRACT

A motor includes a magnet and a coil. $\alpha 2=[\{(Br2-Br1)/Br1\}/(T2-T1)]\times 100 \geq -0.10$ and $\alpha 3=[\{(Br3-Br1)/Br1\}/(T3-T1)]\times 100 \leq -0.12$ are satisfied. In the magnet, Br1 (mT) is a residual magnetic flux density at T1 (° C.), Br2 (mT) is a residual magnetic flux density at T2 (° C.), and Br3 (mT) is a residual magnetic flux density at T3 (° C.), and $\alpha 2$ (%/° C.) is a temperature coefficient at a target temperature of T2 (° C.) with respect to a reference temperature of T1 (° C.), and $\alpha 3$ (%/° C.) is a temperature coefficient at a target temperature of T3 (° C.) with respect to a reference temperature of T1 (° C.) in conditions of T1=23, T2=60, and T3=180.

20 Claims, 3 Drawing Sheets

(56) References Cited

U.S. PATENT DOCUMENTS

| | | | | |
|---|---|---|---|---|
| 2014/0354204 A1* | 12/2014 | Tachibana | ............... | H02P 6/08 |
| | | | | 318/473 |
| 2015/0001980 A1* | 1/2015 | Zhang | ................... | H02K 21/16 |
| | | | | 310/156.43 |
| 2015/0022126 A1* | 1/2015 | Schulz | ................... | H02P 21/22 |
| | | | | 318/400.02 |
| 2015/0171679 A1* | 6/2015 | Nishiyama | ............ | H02K 1/278 |
| | | | | 310/156.07 |
| 2015/0288233 A1* | 10/2015 | Kim | .................... | H02K 1/2766 |
| | | | | 310/156.43 |

OTHER PUBLICATIONS

Y. Kasai et al., MQ2 and MQ3 Magnets—Improvements in Production Technology and Properties, Electric furnace steel, Oct. 1991, vol. 62, No. 4, p. 241-251.

* cited by examiner

MOTOR

BACKGROUND OF THE INVENTION

1. Field of the Invention

The present invention relates to a motor.

2. Description of the Related Art

Patent Document 1 discloses a variable magnetic flux drive system that changes a magnetic force of a magnet in a motor. This system improves its entire efficiency and can correspond to a wide speed range.

However, the system disclosed in Patent Document 1 is complicated in control. Furthermore, the system needs a certain level or more magnetic field to change the magnetic force of the magnet and flows an electric current corresponding to the magnetic field through a coil. To do this, the motor needs to be temporarily stopped for determination of a position of the magnet to the coil. A large magnetic field is necessary for change in magnetization of the magnet, and a coil and a power source for the large magnetic field are a large scale.

Patent Document 1: JP 2008-029148A

SUMMARY OF THE INVENTION

The present invention has been achieved under such circumstances. It is an object of the invention to obtain a motor having an easy system control and no need to be temporarily stopped for change in a magnetic force of a magnet.

To achieve the above object, the motor of the present invention is a motor including a magnet and a coil, wherein $\alpha 2 = [\{(Br2-Br1)/Br1\}/(T2-T1)] \times 100 \geq -0.10$ and
$\alpha 3 = [\{(Br3-Br1)/Br1\}/(T3-T1)] \times 100 \leq -0.12$ are satisfied, where in the magnet, Br1 (mT) is a residual magnetic flux density at T1 (° C.), Br2 (mT) is a residual magnetic flux density at T2 (° C.), and Br3 (mT) is a residual magnetic flux density at T3 (° C.), and $\alpha 2$ (%/° C.) is a temperature coefficient at a target temperature of T2 (° C.) with respect to a reference temperature of T1 (° C.), and $\alpha 3$ (%/° C.) is a temperature coefficient at a target temperature of T3 (° C.) with respect to a reference temperature of T1 (° C.) in conditions of T1=23, T2=60, and T3=180.

The motor of the present invention has the above configuration, and thus has an easy system control and no need to be temporarily stopped for change in a magnetic force of the coil.

Preferably, Br1≥1300 mT is satisfied.
Preferably, Br2≥1250 mT is satisfied.
Preferably, Br3≤1100 mT is satisfied.
Preferably, the magnet is an R-T-B based magnet, and R is one or more rare earth elements, T is one or more transition metal elements, and B is boron.
Preferably, R contains Nd, and T contains Fe.
Preferably, a content of Si in the R-T-B based magnet is 0 to 0.4 wt % (including zero) provided that a whole of the R-T-B based magnet is 100 wt %.
Preferably, the motor of the present invention is an IPM motor.

DESCRIPTION OF THE PREFERRED EMBODIMENTS

Figure 1:
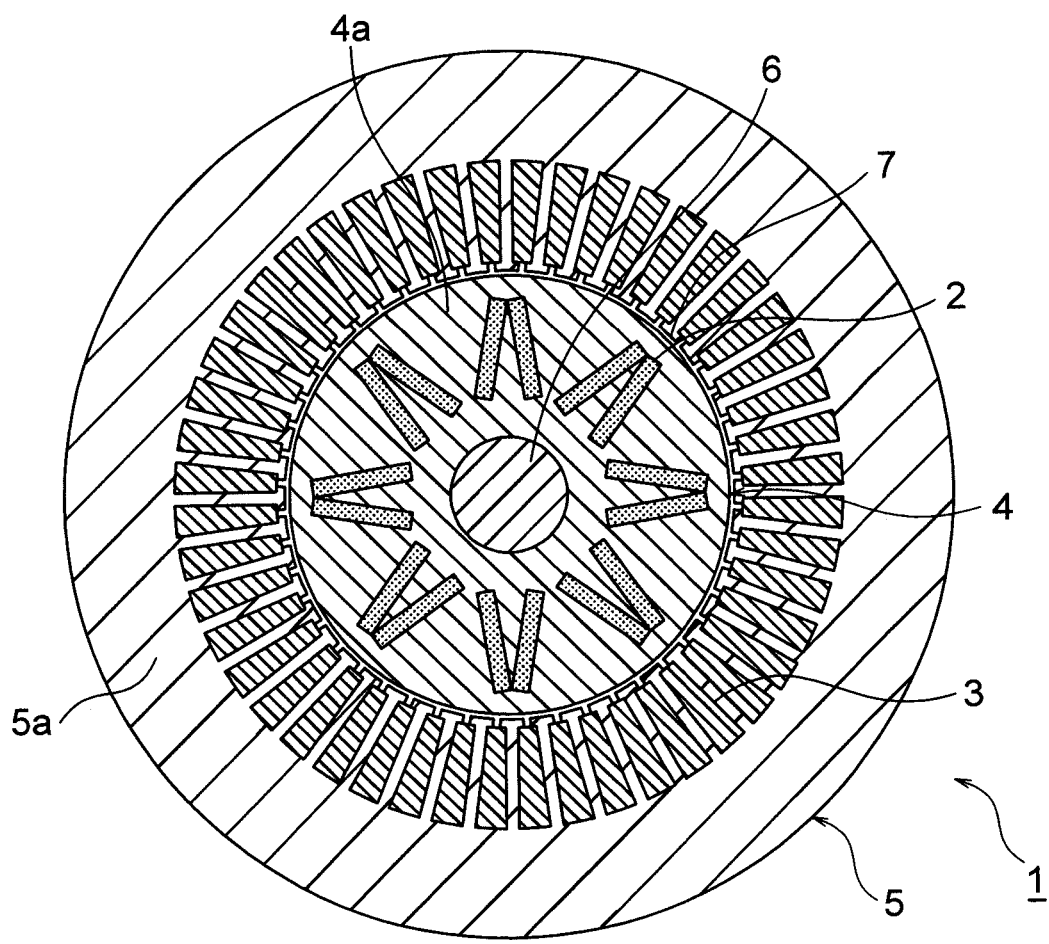
FIG. 1 is a schematic view of an IPM motor according to the present embodiment.

Hereinafter, the present invention will be described based on an embodiment shown in the figure.

As shown in the figure, an IPM motor 1 is a motor according to the present embodiment and consists of a rotor 4, a stator 5, and a shaft 6. IPM is an abbreviation of Interior Permanent Magnet, and an IPM motor is a motor having a magnet embedded structure.

In the IPM motor 1, the rotor 4 and the stator 5 are arranged via a space 7 between the stator and the rotor. In the rotor 4, a permanent magnet 2 is embedded in a slot (not shown) in a rotor iron core 4a. The stator 5 has a stator iron core 5a and a coil 3.

In the present embodiment, the slot represents a space arranged in the rotor iron core 4a for embedding the permanent magnet 2 in the rotor iron core 4a. The rotor 4 contains the permanent magnet 2 and the rotor iron core 4a, and the stator 5 contains the coil 3 and the stator iron core 5a.

From a viewpoint of heat control, an air gap is preferably provided between the permanent magnet 2 and the rotor iron core 4a, but it is difficult for the permanent magnet 2 and the rotor iron core 4a to completely avoid touching each other.

The permanent magnet 2 is preferably fixed to the rotor iron core 4a. When the permanent magnet 2 is not fixed to the rotor iron core 4a, the permanent magnet 2 moves in using the motor. In this case, a contact state between the permanent magnet 2 and the rotor iron core 4a changes. This causes a variation of electric resistance between the permanent magnet 2 and the rotor iron core 4a and generates unevenness of eddy current mentioned later. Then, heat generation by eddy current becomes uneven, and it becomes hard to control a magnet temperature. The permanent magnet 2 is fixed to the rotor iron core 4a by any method, but is preferably fixed by filling a resin in the space between the permanent magnet 2 and the rotor iron core 4a. The electric resistance between the permanent magnet 2 and the rotor iron core 4a is preferably 10Ω or less. In this case, it becomes easy to positively generate eddy current described later and appropriately control the magnet temperature.

The arrangement in the rotor of the permanent magnet 2 is not limited and is determined by motor property. From a viewpoint of heat control, the permanent magnet 2 is preferably arranged in a portion having a relatively low temperature. For example, when cooling the permanent magnet 2 from the shaft 6, the permanent magnet 2 is preferably arranged in a portion close to the shaft 6. When cooling the permanent magnet 2 from the stator 5, the permanent magnet 2 is preferably arranged in a portion close to the stator 5. The permanent magnets 2 are preferably arranged in V shape in the rotor 4 as shown in FIG. 1 because heat generated in the permanent magnets 2 is easily transmitted to both of the shaft 6 and the stator 5.

The permanent magnet 2 inserted into one slot arranged in the rotor iron core 4a is not necessarily single. A plurality of the permanent magnets 2 may be inserted into one slot. The electric resistance between the permanent magnets 2 inserted adjacently in one slot is preferably 10Ω or less. In this case, it becomes easy to positively generate an eddy current mentioned later and appropriately control a magnet temperature. The permanent magnet 2 has any shape, but preferably has a shape where a contact area between a plurality of the magnets can be large. Furthermore, the permanent magnet 2 is preferably a parallelepiped in consideration of cost.

The rotor iron core 4a is preferably composed of a silicon steel sheet. In case of using a silicon steel sheet, the rotor iron core 4a can be manufactured by providing the silicon steel sheet with a hole to be the slot and overlapping a plurality of the sheets. In this case, the silicon steel sheet preferably has a thickness of 0.25 to 0.5 mm per one sheet from a viewpoint of facilitation of the temperature control.

In a conventional IPM motor capable of utilizing a reluctance torque due to magnetization of a rotor iron core in addition to a magnet torque due to magnetization of a permanent magnet, the magnet torque is useful in low-speed rotation, but meanwhile causes lowering of torque in high-speed rotation. This is because a counter electromotive force generated in a coil of a stator by a magnetic force of the permanent magnet becomes large in high-speed rotation. In addition, it is necessary to generate a counter magnetic field for offsetting the counter electromotive force. This counter magnetic field reduces the efficiency of the motor.

However, the IPM motor according to the present embodiment shown below can improve torque and efficiency in wide temperature range and rotation number range.

In the IPM motor 1 according to the present embodiment, an R-T-B based magnet having a temperature coefficient of a residual magnetic flux density within a predetermined range is used as the permanent magnet 2, and torque and efficiency can be thus improved.

Specifically, the permanent magnet 2 having the following relations is used.

Br1 (mT) is a residual magnetic flux density of the permanent magnet 2 at T1 (° C.), Br2 (mT) is a residual magnetic flux density of the permanent magnet 2 at T2 (° C.), and Br3 (mT) is a residual magnetic flux density of the permanent magnet 2 at T3 (° C.). T1=23, T2=60, and T3=180 are satisfied. α2 (%/° C.) is a temperature coefficient of the permanent magnet 2 at a target temperature of T2 (° C.) with respect to a reference temperature of T1 (° C.). α3 (%/° C.) is a temperature coefficient of the permanent magnet 2 at a target temperature of T3 (° C.) with respect to a reference temperature of T1 (° C.). In this case, the permanent magnet 2 satisfying the following relations is used.

$\alpha 2=[\{(Br2-Br1)/Br1\}/(T2-T1)] \times 100 \geq -0.10$ $\alpha 3=[\{(Br3-Br1)/Br1\}/(T3-T1)] \times 100 \leq -0.12$ Here, since α2−0.10 is satisfied, the permanent magnet 2 is a magnet excellent in a temperature property at 60° C. and excellent even when used for ordinary purpose at low temperature. Since the permanent magnet 2 satisfies α3≤−0.12, however, a lowering width of a residual magnetic flux density at 180° C. is larger as compared to a residual magnetic flux density at 23° C. That is, the permanent magnet 2 has a low residual magnetic flux density at high temperature and is a magnet that is considered to be unsuitable for ordinary use at high temperature.

The permanent magnet 2 used for the IPM motor 1 according to the present embodiment is, as described above, excellent in temperature property at 60° C., but is poor in temperature property at 180° C. That is, the permanent magnet 2 is a magnet that is considered to be unsuitable for ordinary use at high temperature. With such a permanent magnet 2, the IPM motor 1 according to the present embodiment is excellent in torque and efficiency not only in the case of low temperature (60 to 80° C.) and low-speed use but also in the case of high temperature (150 to 200° C.) and high-speed use. That is, with the above permanent magnet 2 that is considered to be unsuitable for ordinary use at high temperature, the IPM motor 1 is excellent in torque and efficiency at wide range temperature and rotation number.

Preferably, Br1≥1300 mT is satisfied. Preferably, Br2≥1250 mT is satisfied. Preferably, Br3≤1100 mT is satisfied. Furthermore, a relative permeability μr at T3 is preferably 1.03 or more because the effects of the present invention can be demonstrated at an actual operating point of the motor. Incidentally, a relative permeability μr is a gradient in the second quadrant of a demagnetization curve of a magnetic flux density with respect to a magnetic field representing magnetic properties by cgs unit.

In the present application, a low speed represents a state where a rotation number is 50% or less of a maximum rotation number, and a high speed represents a state where a rotation number is 80% or more of a maximum rotation number. Incidentally, a motor having a maximum rotation number of 6000 to 20000 rpm is often used as EV motors and HEV motors. A motor having a maximum rotation number of around 2000 rpm is often used as a motor for washing machine.

The present inventors conceive that the following mechanism shows how torque and efficiency are improved in wide temperature range and rotation number range using the permanent magnet 2 having the above structure.

First, in the IPM motor 1, the rotor 4 is rotated using a magnet torque due to the permanent magnet 2 and a reluctance torque due to a magnetic circuit design. In the low-speed rotation, a counter electromotive force mentioned later is small, and thus the higher the magnet torque is, the higher the entire torque is. In the high-speed rotation, however, the higher the magnet torque is, the larger a counter electromotive force generated in the coil 3 of the stator 5 by a magnetic force of the permanent magnet 2 is, and the reluctance torque is decreased. The reluctance torque is decreased, and the entire torque is thus decreased. A counter magnetic field needs to be applied for offsetting this counter electromotive force, and this counter magnetic field reduces the efficiency of the IPM motor 1.

When the rotor 4 of the IPM motor 1 is rotated at high speed, an eddy current occurs in the permanent magnet 2. And the permanent magnet 2 becomes high temperature due to Joule heat of the eddy current. This heat generation lowers residual magnetic flux density Br of the permanent magnet 2. At this time, with the permanent magnet 2 according to the present embodiment and α3≤−0.12, the lowering of residual magnetic flux density Br due to the heat generation becomes large in the present embodiment. Then, the lowering of a magnetic flux amount of the permanent magnet 2 becomes large. The lowering of the magnetic flux amount lowers the magnet torque, and the counter electromotive force is thus decreased. Thus, the reluctance torque becomes high, and the entire torque of the IPM motor 1 in the case of high temperature and high speed use becomes high. In addition, a counter electromotive force in the case of high temperature and high speed use is also decreased, and thus an intensity of a necessary counter magnetic field is also decreased, and the efficiency is improved.

When the IPM motor 1 is switched from the high-speed rotation to the low-speed rotation, the temperature of the permanent magnet 2 is preferably decreased. There is no limit to the method for controlling the temperature of the permanent magnet 2 depending on the rotation number of the IPM motor 1. For example, the temperature of the permanent magnet 2 can be controlled by monitoring the rotation number of the IPM motor 1 using a sensor and operating a cooling mechanism (air cooling, water cooling, oil cooling etc.) depending on the rotation number.

When the temperature of the permanent magnet 2 is decreased, residual magnetic flux density Br of the permanent magnet 2 is increased. Then, the magnet flux amount of the permanent magnet 2 becomes large, and the magnet torque becomes large. In the present embodiment, since the permanent magnet 2 having a large residual magnetic flux density at a low temperature, that is, the permanent magnet 2 satisfying $\alpha2 \geq -0.10$ is used, the torque at low-speed rotation is improved, and the efficiency at low-speed rotation is improved. In the IPM motor 1, a magnetic force of a magnet can be largely changed by merely changing the temperature, and thus the system control for changing the magnetic force of the magnet is easy, and there is no need to temporarily stop the motor for changing the magnetic force of the magnet.

A rare earth permanent magnet is used as the permanent magnet 2, for example. There is no limit to the composition of the rare earth permanent magnet. For example, an R-T-B based magnet may be used.

R of the R-T-B based magnet is one or more rare earth elements. There is no limit to the kind of R contained in the R-T-B based magnet according to the present embodiment, but R preferably contains Nd and more preferably contains Nd and Pr. Furthermore, R may contain Dy.

B of the R-T-B based magnet is boron. A part of boron may be substituted by carbon.

T of the R-T-B based magnet is one or more transition metal elements. T may contain Fe. T may contain Fe or Fe and Co. T may contain one or more selected from transition metal elements other than Fe and Co.

The R-T-B based magnet according to the present embodiment may contain other element other than R, T, and B. There is no limit to the kind of other element. For example, other element may contain Si, Al, S, Mn, Zr, Nb, Cu, Ga, or the like, but may contain the other element.

The R-T-B based magnet according to the present embodiment preferably contains R and B at the following contents with respect to the total mass, but the contents are not limited to the following numerical ranges.

R: 29 to 33 mass %
B: 0.8 to 1.1 mass %

Furthermore, elements other than R, B, and Fe mentioned above are preferably contained in total at 3 mass % or less.

There is no limit to the method for adjusting a temperature coefficient of a residual magnetic flux density to achieve $\alpha2 \geq -0.10$ and $\alpha3 \leq -0.12$ at the same time. For example, $\alpha2 \geq -0.10$ and $\alpha3 \leq -0.12$ are easily achieved at the same time by decreasing the Curie temperature of the permanent magnet 2. Specifically, one or more selected from a group of Al, S, Si, Mn, and Ga can be solid soluted in an $R_2Fe_{14}B$ phase. There is no limit to the method of solid solution of one or more selected from a group of Al, S, Si, Mn, and Ga. For example, in a manufacture step mentioned later, a raw material powder containing one or more selected from a group of Al, S, Si, Mn, and Ga is added in mixturing of raw material powder. Incidentally, the solid solution of Co is preferable in terms of improving temperature property at low temperature, but tends to increase the Curie temperature. The solid solution of Cu is preferable in terms of improving heat resistance of the magnet. The solid solution of Zr is preferable in terms of improving linearity of μr.

Each of the above-mentioned elements is preferably contained at the following amounts.

Al: 0.1 to 1 wt %
S: 0.01 to 0.5 wt %
Mn: 0.01 to 0.5 wt %
Cu: 0.01 to 0.5 wt %
Zr: 0.05 to 0.8 wt %
Ga: 0.05 to 0.8 wt %
Si: 0 to 0.4 wt % (including 0 wt %)

In particular, when Si is contained within the above range, it becomes easy to decrease a residual magnetic flux density at high temperature.

As described above, the electric resistance between the permanent magnet 2 and the rotor iron core 4a and the electric resistance between two permanent magnets 2 adjacently inserted into the slot arranged in the rotor iron core 4a are preferably $10^{-4}\Omega$ or more and $10\Omega$ or less. The above electric resistances are easily set to $10^{-4}\Omega$ or more and $10\Omega$ or less by failing to perform a surface treatment against the surfaces of the permanent magnets 2 or by performing a surface treatment for electric conductance against the surfaces of the permanent magnets 2. Examples of the surface treatment for electric conductance include a surface modification by oxidation treatment, chemical conversion treatment, or the like, and a plating.

In the permanent magnet 2 according to the present embodiment, residual magnetic flux density Br at high temperature preferably decreases compared to residual magnetic flux density Br at room temperature, but coercivity HcJ is preferably high at both high temperature and room temperature (low temperature). For high coercivity HcJ at both high temperature and room temperature, a heavy rare earth element is preferably diffused in a grain boundary. The heavy rare earth element is preferably one or more of Dy and Tb. The diffusion in a grain boundary improves coercivity HcJ and improves torque property and efficiency at low temperature and high temperature.

Hereinafter, a manufacture method of an R-T-B based sintered magnet used for the IPM motor according to the present embodiment will be described in detail, but a known method is used unless otherwise noted.

The R-T-B based sintered magnet according to the present embodiment can be manufactured by an ordinary powder metallurgy method. This powder metallurgical method includes a preparation step of preparing a raw material alloy, a pulverization step of pulverizing the raw material alloy and obtaining a raw material fine powder, a pressing step of pressing the raw material fine powder and manufacturing a green compact, a sintering step of sintering the green compact and obtaining a sintered body, and a heat treatment step of performing an aging treatment to the sintered body.

The preparation step is a step of preparing a raw material alloy having each element contained in the rare earth magnet according to the present embodiment. First, raw material metals having predetermined elements or so are prepared and used to perform a strip casting or so. This makes it possible to prepare a raw material alloy. The raw material metals or so include rare earth metals, rare earth alloys, pure iron, ferro-boron, carbon, and alloys of these, for example. These raw material metals or so are used to prepare a raw material alloy for obtaining a rare earth magnet having a desired composition.

The strip casting method is explained as a preparation method. In the strip casting method, a molten metal is poured into a tundish, and the molten metal where the raw material metals or so are melted is poured from the tundish onto a rotating copper roll whose inside is water-cooled and is cooled and solidified. A cooling rate of the solidification can be controlled in a desired range by adjusting temperature and supply amount of the molten metal and rotating speed of the cooling roll. The cooling rate of the solidification is preferably appropriately determined based on conditions of composition or so of a rare earth magnet to be manufactured, but is preferably 500 to 11000° C./second. When the cooling rate of the solidification is controlled in this way, a residual magnetic flux density at a high temperature is decreased, and $\alpha 3 \leq -0.12$ is easily obtained. The mechanism where a residual magnetic flux density at a high temperature is changed due to the above cooling rate is unclear, but the present inventors conceive that the reason for this is that a distribution ratio of the elements solid soluted in the main phase grains is changed depending on the above cooling rate.

The pulverization step is a step of pulverizing the raw material alloy obtained in the preparation step and obtaining a raw material fine powder. This step is preferably carried out by two steps of a coarse pulverization step and a fine pulverization step, but may be carried out by one step of the fine pulverization step.

The coarse pulverization step can be carried out in an inert gas atmosphere using a stamp mill, a jaw crusher, a brown mill, or the like. A hydrogen storage pulverization may be carried out. In the coarse pulverization, the raw material alloy is pulverized until a coarse powder having a grain size of about hundreds μm to several mm is obtained.

In the fine pulverization, the coarse powder obtained in the coarse pulverization step (the raw material alloy in case of omitting the coarse pulverization step) is finely pulverized to prepare a raw material fine powder having an average grain size of about several μm. The raw material fine powder has an average grain size determined by considering a growth degree of crystal grains after being sintered. The fine pulverization can be carried out by using a jet mill, for example.

A pulverization aid can be added before the fine pulverization. When a pulverization aid is added, pulverization property is improved, and magnetic field orientation in the pressing step becomes easy. There is no limit to kind or additive amount of the pulverization aid.

The pressing step is a step of pressing the raw material fine powder in a magnetic field and manufacturing a green compact. Specifically, the green compact is manufactured by conducting the pressing in such a manner that the raw material fine powder is filled in a press mold arranged in an electromagnet, and the raw material fine powder is thereafter pressurized while the electromagnet is used to apply a magnetic field to orient crystal axes of the raw material fine powder. The pressing in magnetic field is carried out at about 30 to 300 MPa in a magnetic field of 1000 to 1600 kA/m, for example.

The sintering step is a step of sintering the green compact and obtaining a sintered body. The sintered body can be obtained by sintering the green compact in a vacuum or in an inert gas atmosphere after the pressing in magnetic field. The sintering conditions are appropriately determined depending upon conditions of composition of the green compact, pulverization method of the raw material fine powder, powder size, and the like.

The heat treatment step is a step of performing an aging treatment to the sintered body. The heat treatment is performed at a temperature range of 500° C. to 900° C., and may be performed by two steps. When the heat treatment temperature is changed within the above range, it is possible to change a residual magnetic flux density at a high temperature and control $\alpha 3$.

The cooling rate after the heat treatment is preferably 50° C./minute or more and 250° C./minute or less. When the cooling rate is changed within the above range, it is possible to change a residual magnetic flux density at a high temperature and control $\alpha 3$.

The present embodiment may include a step of performing a grain boundary diffusion of heavy rare earth elements in the sintered body. The grain boundary diffusion can be carried out by performing a heat treatment after heavy rare earth elements are attached to the surface of the sintered body subjected to a pretreatment as necessary by application, deposition, or the like. This makes it possible to further improve coercivity of the R-T-B based sintered magnet finally obtained. Incidentally, there is no limit to the contents of the pretreatment. For example, the pretreatment is a treatment of performing an etching by a known method, cleaning, and drying.

Incidentally, heavy rare earth elements are attached by any method. For example, there is a method using vapor deposition, sputtering, electrodeposition, spray coating, brush coating, dispenser, nozzle, screen printing, squeegee printing, sheet construction, or the like.

The heavy rare earth elements are adhered and then diffused in the sintered body. There is no limit to the diffusion treatment, but the diffusion treatment is normally performed by heating in vacuum or in inert gas. The diffusion treatment temperature is not limited either.

The R-T-B based sintered body obtained by the above steps may be subjected to the surface treatment, such as plating, resin coating, oxidation treatment, and chemical conversion treatment.

The R-T-B based sintered body obtained by the above steps is finally processed into an R-T-B based sintered magnet by applying a magnetic field before and after being combined with the rotor. A magnetization rate is a rate not in a complete magnetization state when a flux generated by the magnet magnetized by a magnetic field of 5T is 100%. The temperature coefficient of Br can be changed by changing the magnetization rate. The magnetization rate is preferably 97.0% to 100.0%, more preferably 97.0% to 99.5%. When the magnetization rate is 97.0% to 100.0%, $\alpha 3 \leq -0.12$ is easily achieved, and the torque and efficiency at low temperature are easily improved. Furthermore, when the magnetization rate is 97.0% to 99.5%, the efficiency at high temperature is easily improved.

The IPM motor 2 according to the present embodiment can be manufactured by an ordinary manufacture method except for using the above R-T-B based sintered magnet, and is manufactured by any method.

The embodiment of the present invention has been accordingly described, but the present invention is not limited to the above embodiment and may be variously changed within the scope thereof.

For example, the above embodiment describes a case where the R-T-B based rare earth sintered magnet is used for the IPM motor 2, but may be used for motors other than the IPM motor 2. The R-T-B based rare earth sintered magnet having the above temperature property is particularly suitable for motors using a magnet torque and a reluctance torque. From this point of view, it is conceivable that linear motors can obtain favorable properties by using the permanent magnet of the present embodiment. In addition to the IPM motors and the linear motors, the above R-T-B based rare earth sintered magnet for motors can be used for SPM motors, permanent magnet direct current motors, voice coil motors, vibration motors, and the like.

The motor of the present invention can be used for any purpose. For example, the motor of the present invention can be used for a compressor of an automobile (especially HV, HEV, FCV etc.) as well as a compressor such as an air conditioner.

EXAMPLES

Hereinafter, the subject matter of the present invention will be described in more detail with reference to examples and comparative examples, but the present invention is not limited to the examples.

Experimental Example 1

First, in order to obtain sintered magnets having a composition of 20% Nd—7% Pr—4% Dy—z % Co—x % Al—0.2% Cu—0.2% Zr—0.1 wt % Ga—y % Si—0.95% B—bal. Fe by weight ratio, raw material alloys having the above composition were prepared by strip casting (SC) method. Incidentally, the cooling rate of solidification of the raw material alloys was 2500° C./second.

Next, hydrogen was stored in the raw material alloys at room temperature, and the raw material alloys were subjected to hydrogen pulverization (coarse pulverization) by a dehydrogenation treatment at 540° C. for 3 hours. Incidentally, each step (fine pulverization and pressing) from the hydrogen pulverization treatment to sintering was carried out in an atmosphere having an oxygen concentration of less than 100 ppm in each example and comparative example.

Next, a zinc stearate was added as a pulverization aid to the coarsely pulverized powders of the raw material alloys at 0.05 wt % before a fine pulverization and after the hydrogen pulverization, and the coarsely pulverized powders were mixed using a Nauta Mixer. Thereafter, the fine pulverization was carried out using a jet mill to obtain a finely pulverized powder having an average grain size of about 4 μm.

The finely pulverized powder obtained was filled in a press mold arranged in an electromagnet and pressed at 120 MPa while applying a magnetic field of 1200 kA/m to obtain a green compact. Thereafter, the obtained green compact was fired while being held in a vacuum at 1050° C. for 4 hours, and was then rapidly cooled to obtain a sintered body (R-T-B based sintered magnet) having the above composition. The obtained sintered body was subjected to a two-step aging treatment at 800° C. for 1 hour and at 550° C. for 1 hour (both in Ar gas atmosphere), and was rapidly cooled to obtain an R-T-B based sintered magnet of Examples 1 to 3 and Comparative Examples 1 to 4 shown in Table 1. Incidentally, each magnet had a rectangular parallelopiped shape of 11 mm×11 mm×10 mm.

A residual magnetic flux density of each of the obtained R-T-B based sintered magnets was measured at a magnetization rate of 99.5% using a B-H tracer. Br1, Br2, and Br3 were respectively measured in conditions of T1=23° C., T2=60° C., and T3=180° C. to calculate α2 and α3. The results are shown in Table 1.

Furthermore, a two-dimensional simulation was carried out provided that each of the obtained R-T-B based sintered magnets (Examples 1 to 3 and Comparative Examples 1 to 4) was applied to the IPM motor shown in FIG. 1, and torque and efficiency were calculated. In this simulation, an oil cooling was used as a cooling mechanism. In this simulation, the efficiency was calculated as output/input, the input was calculated by measuring electricity, the output was calculated by angular speed×torque. The angular speed was calculated by rotation number.

Then, torque and efficiency at a fixed rotation number of 3000 rpm and a changing temperature of 60 to 80° C. were simulated. Furthermore, torque and efficiency at a fixed rotation number of 8200 rpm and a changing temperature of 150 to 200° C. were simulated. The results are shown in Table 2 and Table 3.

In the present embodiment, torque ratio is the ratio when torque of Example 1 (x=0.5, y=0.4, z=2) is 1.000, and efficiency ratio is the ratio when efficiency of Example 1 is 1.000. Table 2 describes torque ratios. Table 3 describes efficiency ratios. In the present example, torque ratios within ±2.0% based on Example 1, that is, torque ratios within 0.980 to 1.020 are evaluated as nearly equal, and efficiency ratios within ±0.04% based on Example 1, that is, efficiency ratios within 0.9996 to 1.0004 are evaluated as nearly equal.

TABLE 1

|  | Al x(wt %) | Si y(wt %) | Co z(wt %) | Br1(mT) | Br2(mT) | Br3(mT) | α2(%/° C.) | α3(%/° C.) |
|---|---|---|---|---|---|---|---|---|
| Comp. Ex. 1 | 0.5 | 0.8 | 2 | 1330 | 1291 | 1111 | −0.079 | −0.105 |
| Comp. Ex. 2 | 0.5 | 0.6 | 2 | 1330 | 1288 | 1094 | −0.085 | −0.113 |
| Ex. 1 | 0.5 | 0.4 | 2 | 1330 | 1285 | 1077 | −0.091 | −0.121 |
| Ex. 2 | 0.5 | 0.2 | 2 | 1330 | 1284 | 1067 | −0.094 | −0.126 |
| Ex. 3 | 0.5 | 0 | 2 | 1330 | 1281 | 1054 | −0.099 | −0.132 |
| Comp. Ex. 3 | 1.0 | 0.7 | 2 | 1262 | 1226 | 1054 | −0.101 | −0.111 |
| Comp. Ex. 4 | 0.5 | 0.2 | 4 | 1330 | 1278 | 1090 | −0.105 | −0.115 |

TABLE 2

| | Torque ratio | | | | | |
|---|---|---|---|---|---|---|
| | 60° C., 3000 rpm | 70° C., 3000 rpm | 80° C., 3000 rpm | 150° C., 8200 rpm | 180° C., 8200 rpm | 200° C., 8200 rpm |
| Comp. Ex. 1 | 1.004 | 1.004 | 1.008 | 0.917 | 0.905 | 0.898 |
| Comp. Ex. 2 | 1.000 | 1.000 | 1.004 | 0.959 | 0.952 | 0.946 |
| Ex. 1 | 1.000 | 1.000 | 1.000 | 1.000 | 1.000 | 1.000 |
| Ex. 2 | 0.996 | 0.996 | 1.000 | 1.033 | 1.034 | 1.030 |
| Ex. 3 | 0.996 | 0.996 | 0.996 | 1.066 | 1.068 | 1.066 |
| Comp. Ex. 3 | 0.990 | 0.991 | 0.992 | 0.960 | 0.951 | 0.950 |
| Comp. Ex. 4 | 0.979 | 0.981 | 0.982 | 0.989 | 0.966 | 0.946 |

TABLE 3

| | Efficiency ratio | | | | | |
|---|---|---|---|---|---|---|
| | 60° C., 3000 rpm | 70° C., 3000 rpm | 80° C., 3000 rpm | 150° C., 8200 rpm | 180° C., 8200 rpm | 200° C., 8200 rpm |
| Comp. Ex. 1 | 1.0000 | 1.0001 | 1.0001 | 0.9983 | 0.9972 | 0.9938 |
| Comp. Ex. 2 | 1.0000 | 1.0001 | 1.0000 | 0.9992 | 0.9981 | 0.9966 |
| Ex. 1 | 1.0000 | 1.0000 | 1.0000 | 1.0000 | 1.0000 | 1.0000 |
| Ex. 2 | 1.0000 | 1.0000 | 1.0000 | 1.0012 | 1.0029 | 1.0018 |
| Ex. 3 | 0.9999 | 1.0000 | 0.9999 | 1.0021 | 1.0056 | 1.0027 |
| Comp. Ex. 3 | 0.9994 | 0.9995 | 0.9995 | 0.9990 | 0.9980 | 0.9971 |
| Comp. Ex. 4 | 0.9990 | 0.9992 | 0.9992 | 0.9997 | 0.9995 | 0.9966 |

The torques at 60° C. of all examples and comparative examples are excellent equally to or more than the torque at 60° C. of Example 1, except that torque at 60° C. of Comparative Example 4 is poor. The efficiencies at 60° C. of all examples and comparative examples are excellent equally to or more than the efficiency at 60° C. of Example 1, except that the efficiencies at 60° C. of Comparative Examples 3 and 4 are poor. The efficiencies at 70° C. and 80° C. show the same trend.

The torques at 180° C. of Examples 1 to 3 are more excellent than those of Comparative Examples 1 to 4. The torques at 150° C. and 200° C. entirely show a similar trend, although a part of the comparative examples is equal to Examples 1 to 3. The efficiencies at 180° C. of Examples 1 to 3 are more excellent than those of Comparative Examples 1 to 4. The efficiencies at 150° C. and 200° C. also entirely show a similar trend, although a part of the comparative examples is equal to Examples 1 to 3.

The motor using the magnet of Examples 1 to 3 having a large absolute value of α3 is more excellent in torque and efficiency than Comparative Examples 1 to 4 when used at both 60 to 80° C. and 150 to 200° C.

Figure 2:
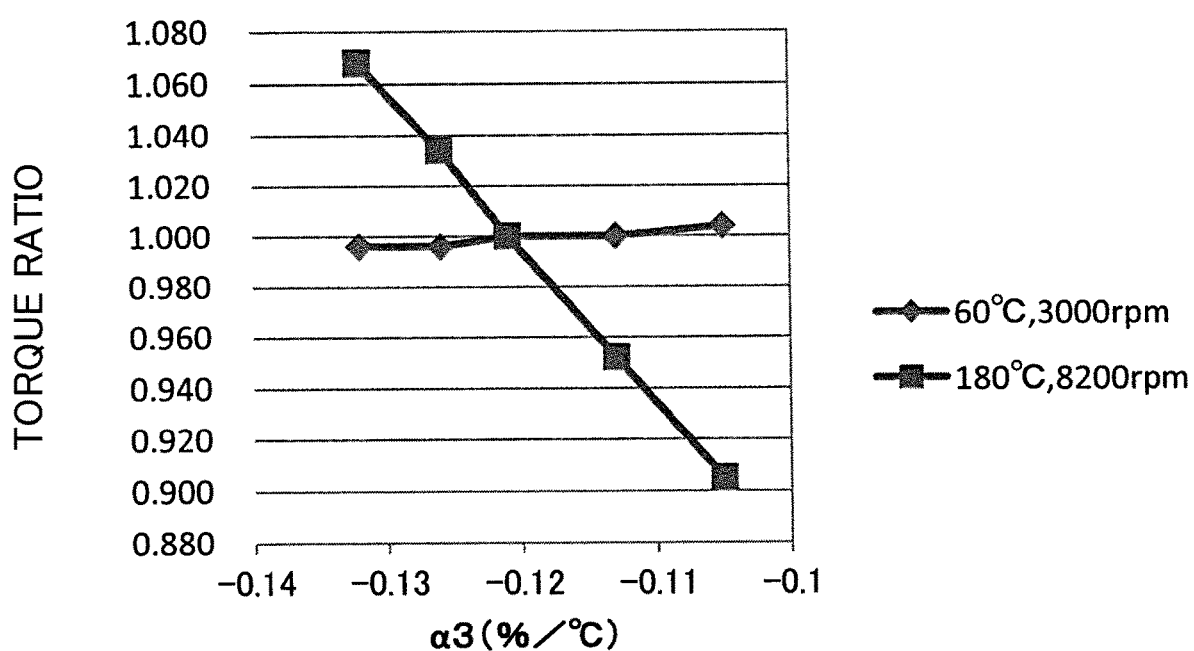
FIG. 2 is a graph showing a relation between a Br temperature coefficient and a torque ratio in the present example.
Figure 3:
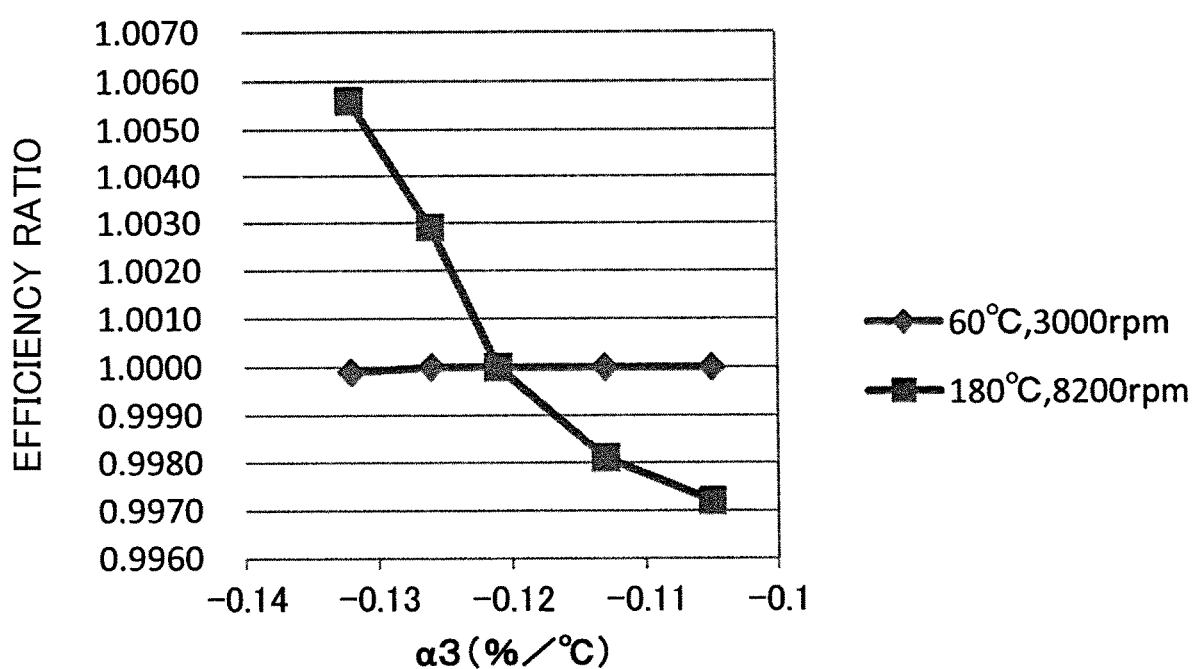
FIG. 3 is a graph showing a relation between a Br temperature coefficient and an efficiency ratio in the present example.

With respect to Examples 1 to 3 and Comparative Examples 1 and 2, which have the same composition other than the content of silicon and the content of cobalt, FIG. 2 is a graph whose horizontal axis is α3 and vertical axis is a torque ratio, and FIG. 3 is a graph whose horizontal axis α3 is and vertical axis is an efficiency ratio.

Table 1, FIG. 2, and FIG. 3 show that absolute values of temperature coefficient α3 of Examples 1 to 3 are higher than those of Comparative Examples 1 and 2. Then, it is understood that torque is higher and efficiency is more excellent in the case of high temperature and high speed rotation when using a magnet having a high absolute value of α3.

Experimental Example 2

Magnets were manufactured in the same manner as Example 3 of Experimental Example 1 except for changing the magnetization rate, and the above-mentioned measurement and simulation were carried out. The results are shown in Table 4 to Table 6. Incidentally, torque and efficiency at 70° C. were not simulated in Experimental Example 2.

TABLE 4

| | Magnetization rate | Br1(mT) | Br2(mT) | Br3(mT) | α2(%/° C.) | α3(%/° C.) |
|---|---|---|---|---|---|---|
| Ex. 31 | 100.0% | 1337 | 1288 | 1052 | −0.099 | −0.132 |
| Ex. 3 | 99.5% | 1330 | 1281 | 1054 | −0.099 | −0.132 |
| Ex. 32 | 97.0% | 1297 | 1249 | 1053 | −0.100 | −0.120 |
| Comp. Ex. 31 | 96.0% | 1283 | 1236 | 1051 | −0.099 | −0.115 |

TABLE 5

| | Torque ratio | | | | |
|---|---|---|---|---|---|
| | 60° C., 3000 rpm | 80° C., 3000 rpm | 150° C., 8200 rpm | 180° C., 8200 rpm | 200° C., 8200 rpm |
| Ex. 31 | 1.000 | 1.001 | 1.062 | 1.063 | 1.062 |
| Ex. 3 | 0.996 | 0.996 | 1.066 | 1.068 | 1.066 |
| Ex. 32 | 0.993 | 0.981 | 1.000 | 0.998 | 0.995 |
| Comp. Ex. 31 | 0.988 | 0.973 | 0.968 | 0.961 | 0.958 |

TABLE 6

| | Efficiency ratio | | | | |
|---|---|---|---|---|---|
| | 60° C., 3000 rpm | 80° C., 3000 rpm | 150° C., 8200 rpm | 180° C., 8200 rpm | 200° C., 8200 rpm |
| Ex. 31 | 1.0000 | 1.0001 | 1.0015 | 1.0058 | 1.0015 |
| Ex. 3 | 0.9999 | 0.9999 | 1.0021 | 1.0056 | 1.0027 |
| Ex. 32 | 0.9996 | 0.9997 | 1.0018 | 1.0010 | 1.0023 |
| Comp. Ex. 31 | 0.9994 | 0.9996 | 1.0001 | 0.9989 | 1.0019 |

Table 4 to Table 6 show that torque and efficiency are excellent at both 60 to 80° C. and 150 to 200° C. in Examples 31 and 32, which have α2 and α3 within predetermined ranges, as well as Example 3. On the other hand, torque at 150 to 200° C., efficiency at 60° C., and efficiency at 180° C. in Comparative Example 31, which has α3 not in a predetermined range, are poorer than those of Example 1.

NUMERICAL REFERENCES

1 . . . IPM motor
2 . . . permanent magnet
3 . . . coil
4 . . . rotor
4a . . . rotor iron core
5 . . . stator
5a . . . stator iron core
6 . . . shaft
7 . . . space between rotor and stator

The invention claimed is:

1. A motor comprising:
a rotor comprising a rotor iron core, a permanent magnet being embedded in a slot in the rotor iron core; and
a stator separated from the rotor by a space, the stator comprising a stator iron core and a coil, wherein
$\alpha 2=[\{(Br2-Br1)/Br1\}/(T2-T1)]\times 100 \geq -0.10$ and $\alpha 3=[\{(Br3-Br1)/Br1\}/(T3-T1)]\times 100 \leq -0.12$ are satisfied, where in the magnet,
Br1 (mT) is a residual magnetic flux density at T1 (° C.), Br2 (mT) is a residual magnetic flux density at T2 (° C.), and Br3 (mT) is a residual magnetic flux density at T3 (° C.), and
$\alpha 2$ (%/° C.) is a temperature coefficient at a target temperature of T2 (° C.) with respect to a reference temperature of T1 (° C.), and $\alpha 3$ (%/° C.) is a temperature coefficient at a target temperature of T3 (° C.) with respect to a reference temperature of T1 (° C.) in conditions of T1=23, T2=60, and T3=180.

2. The motor according to claim 1, wherein Br1≥1300 mT is satisfied.

3. The motor according to claim 2, wherein Br2≥1250 mT is satisfied.

4. The motor according to claim 3, wherein Br3≤1100 mT is satisfied.

5. The motor according to claim 1, wherein
the magnet is an R-T-B based magnet, and
R is one or more rare earth elements, T is one or more transition metal elements, and B is boron.

6. The motor according to claim 2, wherein
the magnet is an R-T-B based magnet, and
R is one or more rare earth elements, T is one or more transition metal elements, and B is boron.

7. The motor according to claim 3, wherein
the magnet is an R-T-B based magnet, and
R is one or more rare earth elements, T is one or more transition metal elements, and B is boron.

8. The motor according to claim 4, wherein
the magnet is an R-T-B based magnet, and
R is one or more rare earth elements, T is one or more transition metal elements, and B is boron.

9. The motor according to claim 5, wherein
R contains Nd, and
T contains Fe.

10. The motor according to claim 6, wherein
R contains Nd, and
T contains Fe.

11. The motor according to claim 7, wherein
R contains Nd, and
T contains Fe.

12. The motor according to claim 8, wherein
R contains Nd, and
T contains Fe.

13. The motor according to claim 5, wherein
the R-T-B based magnet contains Si at 0 to 0.4 wt % (including zero), where a whole of the R-T-B based magnet is 100 wt %.

14. The motor according to claim 6, wherein
the R-T-B based magnet contains Si at 0 to 0.4 wt % (including zero), where a whole of the R-T-B based magnet is 100 wt %.

15. The motor according to claim 7, wherein
the R-T-B based magnet contains Si at 0 to 0.4 wt % (including zero), where a whole of the R-T-B based magnet is 100 wt %.

16. The motor according to claim 8, wherein
the R-T-B based magnet contains Si at 0 to 0.4 wt % (including zero), where a whole of the R-T-B based magnet is 100 wt %.

17. The motor according to claim 1, wherein the motor is an IPM motor.

18. The motor according to claim 2, wherein the motor is an IPM motor.

19. The motor according to claim 3, wherein the motor is an IPM motor.

20. The motor according to claim 4, wherein the motor is an IPM motor.

* * * * *